May 4, 1926.
H. G. HILL
1,583,691
MACHINE FOR CUTTING DESIGNS ON GLASSWARE
Original Filed March 26, 1924    3 Sheets-Sheet 1
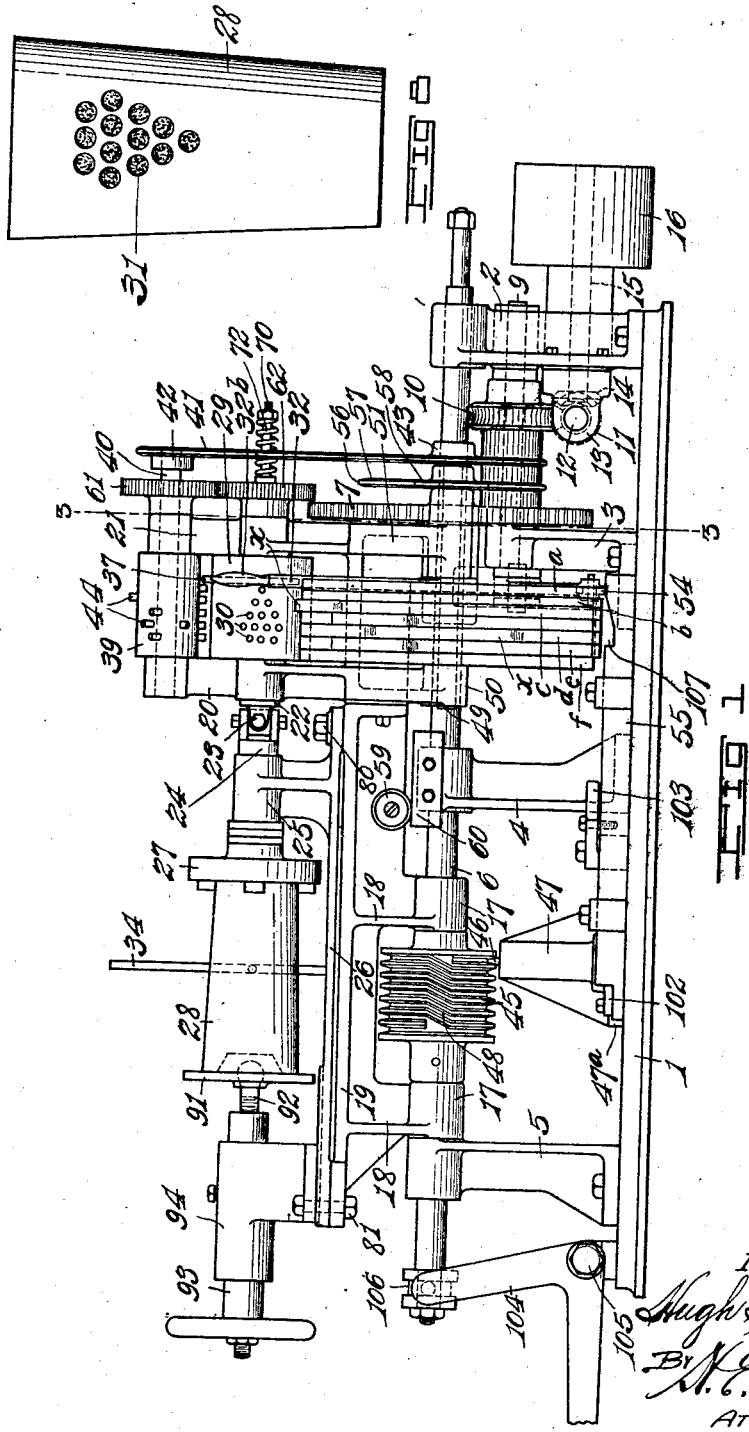

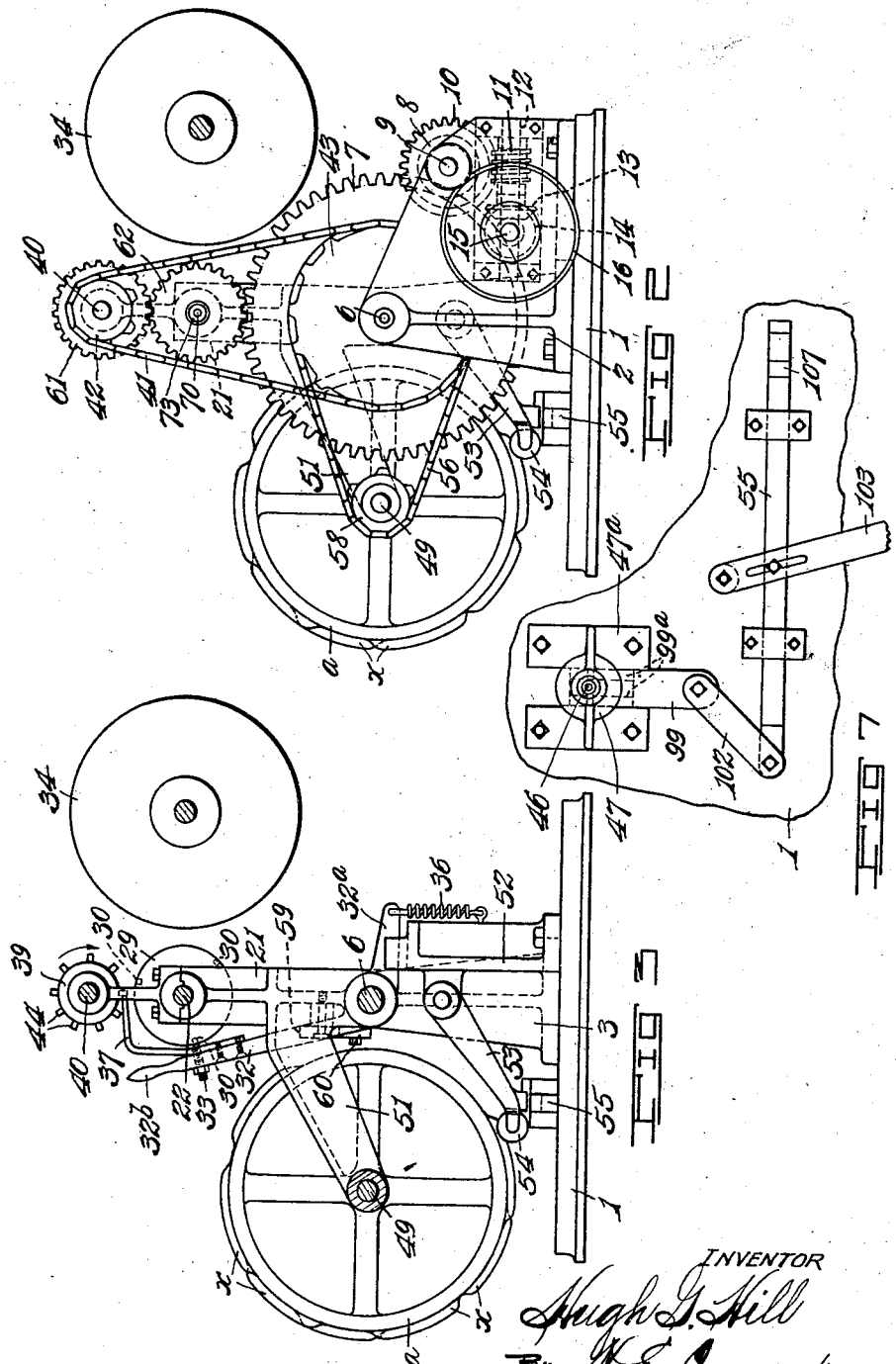

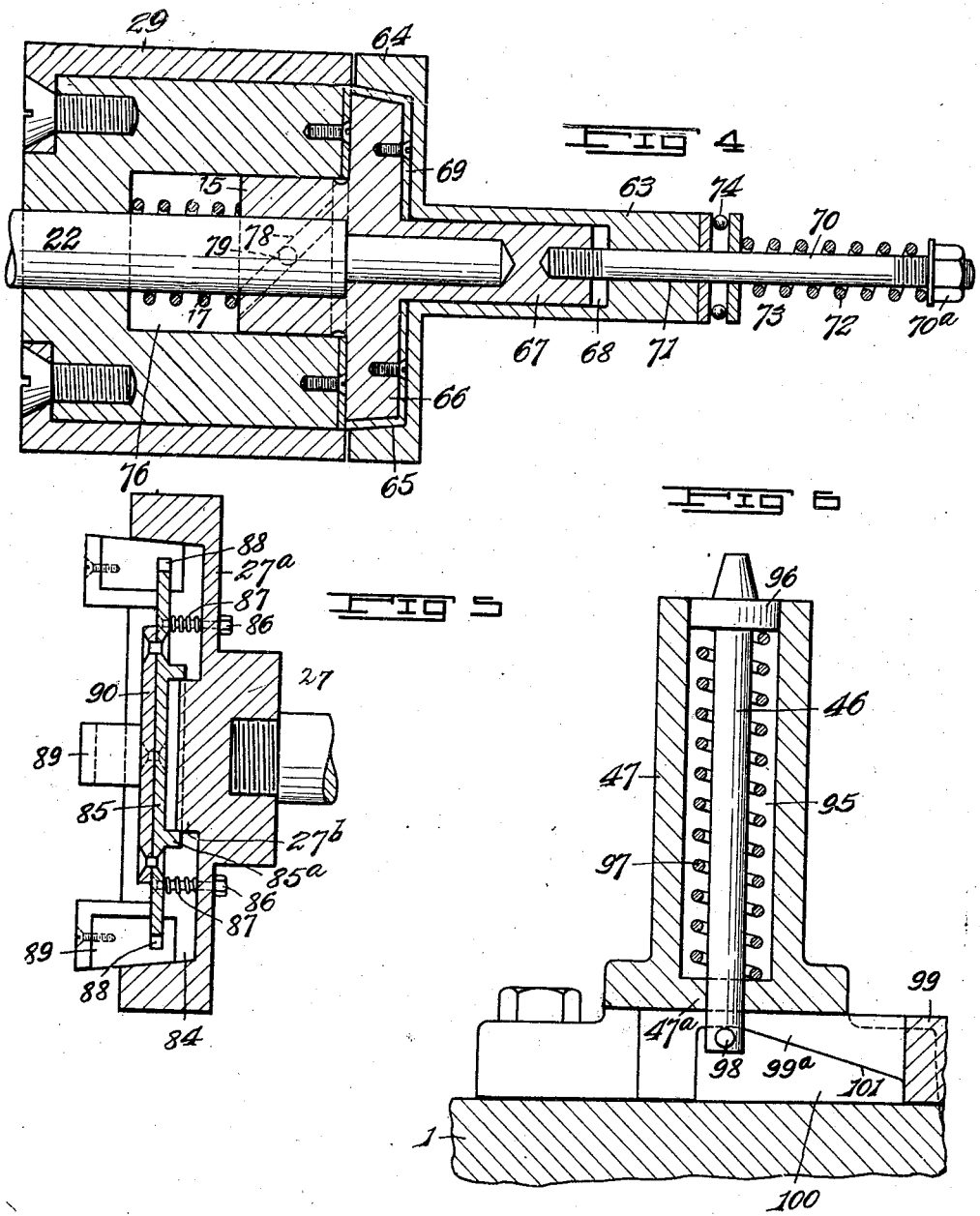

Patented May 4, 1926.

1,583,691

UNITED STATES PATENT OFFICE.

HUGH G. HILL, OF WHEELING, WEST VIRGINIA, ASSIGNOR OF ONE-HALF TO ELIZA O. PORTER, OF WHEELING, WEST VIRGINIA.

MACHINE FOR CUTTING DESIGNS ON GLASSWARE.

Application filed March 26, 1924, Serial No. 701,984. Renewed October 16, 1925.

*To all whom it may concern:*

Be it known that I, HUGH G. HILL, a citizen of the United States of America, and resident of Wheeling, county of Ohio, and State of West Virginia, have invented certain new and useful Improvements in Machines for Cutting Designs on Glassware, of which the following is a specification.

This invention relates broadly to glass cutting or grinding apparatus, and more specifically to a machine for cutting decorative designs upon articles of glassware.

The primary object of the invention is to provide a machine for cutting or grinding upon the surfaces of articles of glassware decorative designs in certain fixed or predetermined patterns.

A further object is to provide a machine of automatic type which operates to ornament the surfaces of articles of glassware by presenting such articles to the action of a cutting or grinding wheel in a series of successive and automatically controlled steps for producing a succession of separate elements or parts of an engraved design of predetermined pattern.

With these and other objects in view, the invention resides in the features of construction, arrangement of parts and combinations of elements which will hereinafter be exemplified, reference being had to the accompanying drawings, in which—

Figure 1 is a front elevation of the invention;

Figure 2 is an end elevation of the same;

Figure 3 is a sectional elevation, the section being taken substantially on line 3—3, Fig. 1;

Figure 4 is an enlarged longitudinal section of the socketed cylinder and the drive-clutch therefor;

Figure 5 is a similar section of one member of the ware-carrying chuck;

Figure 6 is an enlarged vertical detail section of the casing in which the worm-engaging post is mounted;

Figure 7 is a top plan view of the post lowering mechanism; and—

Figure 8 is a plan view of a glass tumbler having thereon a design of the character applied by the invention.

Referring to the drawings, 1 indicates the base of a frame which includes a plurality of upright members or supports 2, 3, 4 and 5, each carrying bearings in which is journaled a horizontal shaft 6 which is both rotatable in and longitudinally shiftable with respect to said bearings. Splined upon said shaft, so as to allow shifting movement of the latter, is a gear wheel 7 disposed in driven relation to a pinion 8 carried by a shaft 9 which has its opposite ends journaled in the supporting members 2 and 3. Also carried by said shaft 9 is a worm gear 10 driven by a worm 11 carried by a shaft 12 which is driven through inter-engaged bevel gears 13 and 14 carried, respectively, by the shaft 12 and a shaft 15, the latter constituting a main drive shaft which is herein shown as having thereon a belt wheel 16 for the reception of a drive belt (not shown).

Mounted upon the shaft 6 are bearing-like sleeves 17 carried on the lower ends of a plurality of leg-like members 18 which are surmounted by a bench 19. Bolted to or otherwise suitably carried by an end of said bench is one of a pair of oppositely disposed upright housings or frame members 20 and 21 in which are journaled the opposite end portions of a horizontal shaft 22 which, at the end adjacent to the bench 19, is connected through a universal coupling or joint 23 with an end of a spindle 24 journaled in a bearing bracket 25 carried by a base plate 26 which is mounted upon said bench. Said spindle has rigidly mounted upon its opposite end one member 27 of a lathe chuck by means of which the article of glassware acted upon, as the tumbler 28, is held during the engraving or grinding operation.

Fixed upon the shaft 22 between the frame members 20 and 21 is a cylinder 29 having in its circumferential surface a plurality of shallow sockets 30 grouped in an arrangement corresponding to the separate parts or elements of the design to be produced on the ware. In this connection, the design which is herein illustrated and which the machine is particularly adapted for producing is that of a conventional bunch of grapes 31. The grouping of said sockets 30 is such that the centers thereof are located in the identical relation and are identically spaced relatively to correspond with the centers of the individual elements, or grapes 31, of the design to be ground upon the article 28, of ware. Said sockets 30 are arranged in a plurality of annularly disposed rows having spaced relation, said rows, as herein shown for illustrative purposes, containing successively from left to right, three, four, three and two sockets, and there being located at the extreme right, or apex, of the group a single socket completing the conventional design.

Pivotally mounted upon or adjacent to the frame member 21 is a substantially upright lever 32 which carries a forwardly projecting pin 33 designed for seating successively in the various sockets 30 for a purpose which will hereinafter be made apparent.

It is here to be noted that the frame members 20 and 21, the bench 19 and the parts superposed upon or over said bench together constitute a carriage which, with the shaft 6 and the cylinder 29, is bodily shiftable horizontally in a longitudinal direction, such shifting being designed to present to the action of the continuously rotated cutting or grinding wheel 34 different surface areas in the length of the articles 28 of ware. Further, while said shaft 6 serves as a support for the carriage, it is freely rotatable in the bearing-like sleeves 17 on which is carried the bench 19 and also in similar sleeves 35 formed on the lower ends of the frame members 20 and 21. Moreover, said carriage is adapted to be rocked forward and rearward on said shaft 6 for presenting the article 28 of ware in, and for withdrawing the same from, operative relation to the wheel 34.

The lever 32 is of bell-crank form and has the forwardly projecting arm 32ª thereof attached to a retractile coil spring 36 which has its lower end attached to a suitable stationary part of the structure. Said spring normally holds said lever in a forwardly thrust position in which the pin 33 of the latter is engaged with the cylinder 29. Said lever has formed on its upper end a handle 32ᵇ whereby it may be grasped by hand, as when it is desired for any reason to swing the lever back to withdraw the pin 33 from engagement with the cylinder 29.

Carried by the lever 32 is an arm 37 having its free end directed forwardly and disposed adjacent to the under side of a rotary cylinder 39 carried by a shaft 40 which is journaled in the upper ends of the frame members 20 and 21. As herein shown, said shaft 40 is driven by a sprocket chain 41 connecting sprocket wheels 42 and 43, carried, respectively, by said shaft 40 and the shaft 6. The end of the arm 37 is disposed in the path of rotary travel of, and is designed to be successively engaged at predetermined intervals or times by a plurality of pins 44 carried by said cylinder 39, said pins having a relative arrangement predetermined by the relative location and arrangement of the various elements or grapes 31 of the design to be produced, as will hereinafter be more fully described.

Rotation of the cylinder 39 following the striking of a pin 44 thereof against the forward end of the arm 37 results in said arm being pushed rearwardly and, through said arm, in the lever 32 being thrust back to the extent that the pin 33 carried by the latter is withdrawn from the socket 30 in which it has been received. This withdrawal of the pin 33 from a socket 30 of the cylinder 29 is effected just prior to the beginning of a left to right shifting movement of the shaft 6 together with the thereby-supported carriage, effected in a manner and by mechanism which will hereinafter be described, and is further designed to free the cylinder 29 to allow the latter to be rotated through the intermediacy of a driving clutch provided therefor, as will hereinafter be described.

The mechanism by means of which longitudinal shifting movement of the shaft 6 and the superposed carriage is effected, as aforesaid, comprises a feed screw 45 fixed on said shaft between the sleeves 17. Said feed screw is disposed to cooperate with an upright post 46 disposed within and projecting from a casing 47 which is stationarily mounted on the base 1. The threads of said screw 45 are non-spirally disposed except at one side where, as shown at 48 in Fig. 1, said threads have the inclination required to drift the therewith engaged post from one thread to the next in a small fraction, as one twelfth, of the circumference of the screw. Thus constructed, the screw and the shaft 6 to which it is fixed, are maintained against longitudinal shifting movement throughout much the greater portion, or about eleven twelfths, of each revolution and the shifting movement is effected in the remaining smaller portion, or one twelfth, of each revolution. The distance of each such individual shifting movement is the required distance between adjacent rows of sockets 30 provided in the cylinder 29 and, consequently, the distance between the circumferential rows of grapes 31 to be ground upon the ware. As is obvious, the shifting is effected during the interval in which the pin 33 occupies a withdrawn position with respect to the sockets 30 in the cylinder 29, the withdrawal, effected as aforesaid, being timed by the prearrangement of the pins 44 on the cylinder 39 to synchronize with said shifting.

The carriage which carries the lathe chuck by means of which the ware is supported normally occupies a rearwardly swung position in which said ware is maintained out of engagement with the grinding wheel 34, and obviously must occupy said position during the longitudinal shifting movement thereof. In each revolution of the shaft 6 said carriage is rocked forward one or more times, according to the number of alined grapes to be produced in the various annularly disposed rows, to present the ware to said grinding wheel for the time required in the production of each grape. The forward rocking of the carriage is effected against the force of gravity which normally maintains said carriage in its rearwardly swung position. The mechanism by means of which such forward rocking is effected comprises a plurality of wheels or disks, as $a$, $b$, $c$, $d$, $e$ and $f$, fixed side by side upon a horizontal shaft 49 which is journaled in rearwardly directed bracket arms 50 and 51 carried by the frame members 20 and 21, respectively. Said disks have a thickness substantially corresponding to the distance between the center lines of the adjacent rows of sockets 30 in the cylinder 29. One disk is provided for each row of sockets 30 in the cylinder 29, and each disk except the last disk, which is an idler, has formed on its periphery one or more raised portions or swells $x$, the number and relative arrangement thereof corresponding to the number of sockets 30 in the therewith corresponding row provided in the cylinder 29.

Pivotally mounted upon a stationary part of the substructure, as upon a fixed support 52 carried by the base 1, is a rearwardly and downwardly inclined arm 53 which has mounted in its lower, or free, end a roller 54. A portion of said arm 53 located rearward of the roller 54 rests upon a bar 55 which is longitudinally shiftable upon the base 1, and said roller is located in substantially underlying relation to the first disk $a$ when the carriage occupies its initial position. The shaft 49 which carries said disks is continuously rotated, such motion being communicated thereto from the shaft 6 by means of a sprocket chain 56 which connects sprocket wheels 57 and 58 fixed on said shafts 6 and 49, respectively. As the disk which overhangs the roller 54 rotates forward, the underlying roller is mounted by the swell, or successively by the plurality of swells, thereof whereby said disks are elevated from their normal level for effecting the forward rocking of the carriage to the required extent for presenting the ware to the grinding wheel 34. Each disk carries a number of relatively spaced swells $x$ corresponding to the number of alined grapes to be ground on the surface of the article of ware during the revolution thereof, thereby to produce the required number of forward rocking movements of the carriage.

Carried on the lower part of the carriage frame at a suitable point is a roller 59 which, in the normal rearwardly rocked position of said carriage, rests upon a short longitudinally extending bar or trackway 60 carried by a suitable stationary part, as the supporting member 4. Said roller 59 and said trackway cooperate to support the carriage both while the latter is stationary and while it is being longitudinally shifted.

The shaft 40 has fixed thereon a gear wheel 61 which is disposed in driving relation to a similar gear 62 fixed upon a spindle 63 which is rotatable in a bearing provided therefor on the frame member 21. Said spindle carries on its inner end a head 64 having in its face a cone socket 65 in which is received a cone-shaped head 66 formed on the end of a stem 67 which is rotatable in a socket 68 provided therefor in said spindle 63. Said head or cone 66 has a facing 69 of leather or the like for frictional engagement with the head 64 and is normally held yieldingly in such engagement so as to be driven by and with said spindle. The means for so holding the cone comprises a rod 70 which is directed through an axial bore 71 in the spindle and has its inner end screwed into the stem 67. A spiral compression spring 72 carried by the outer end portion of the rod 70 provides the required yielding tension, the same being interposed between an adjusting nut $70^a$ carried on the outer end of said rod and the end of the spindle 63, or a disk 73 which is rotatable on ball bearings 74 disposed between it and said spindle, as shown in Fig. 4. Said cone 66 has on the face thereof opposite the stem 67 an axial boss 75 within which is received the adjacent end of the shaft 22 by which the cylinder 29 is carried, as aforesaid. Further, said boss is received within a socket 76 provided therefor in said cylinder. A spring 77 interposed between the inner end of said socket 76 and said boss exerts a yielding pressure counter to the pressure of the spring 72, tending to hold the reverse face of the cone pressed out of frictional driving relation to the adjacent end of said cylinder. Instead of being keyed upon the shaft 22, the hub of the cone has therein an internal diagonally inclined groove 78 in which is slidably engaged a radial pin 79 carried by said shaft, the pin and the shaft, so interengaged, providing for shifting of the cone into and out of frictional driving relation to the cylinder 29. Thus, as will be apparent, when the pin 33 of the lever 32 is engaged with a socket 30 of said cylinder, maintaining the latter and the shaft 22 stationary, the positively driven clutch member, or spindle head, 64 is permitted to rotate more or less freely with respect to said cylinder; but immediately following withdrawal of said pin, the cylinder is frictionally driven by said cone and is rotated until another socket 30 is brought into register with said pin, permitting the latter to drop in said socket, whereupon rotation of the cylinder is instantly stopped for maintaining the chuck-carried article of ware stationary.

The universal joint 23 provided between the shaft 22 and the spindle 24 provides for angular adjustment of the lathe-carrying base plate 26 on the bench 19, such adjustment being required to dispose articles of ware having different tapers, or walls having different angles of inclination with respect to their axes, with their said surfaces at the required right angle to the plane of the grinding wheel 34. The base plate has one end pivoted, as shown at 80, to the bench 19, and a bolt 81 directed through an arcuately curved slot 82 in the opposite end of the bench and having its end threaded into the overlying end of the base plate 26 is adapted to be adjusted to hold firmly the said ends of said members in adjusted relation.

The member 27 of the lathe chuck comprises a head $27^a$ provided with a tapered socket 84 in its face and having an axial boss-like projection $27^b$ which is embraced by a neck portion $85^a$ formed on a plate 85. Said plate is carried on the threaded ends of a plurality of bolts 86 which are directed thereinto through the head $27^a$. Coil springs 87 carried by said bolts between said head and said plate serve to render said plate readily yieldable with respect to said head. Portions of the peripheral edge of the plate 85 are received in recesses 88 provided therefor in a plurality of blocks 89 by which is gripped the base portion of an article of ware seated upon said plate, or upon a facing 90 of leather or other appropriate material attached to said plate. Said blocks have their outer faces inclined to correspond with, and resting against, the inclined walls of the socket 84.

The opposite, or cooperating, members of the ware supporting chuck comprises a rotary plate 91 having ball and socket connection with a stem 92 which is disposed in alinement with the spindle 63. Said stem is carried by a screw 93 which is adjustable longitudinally in a supporting bracket 94 carried by the base plate 26, as shown. As is obvious, the plate 91 is self-adjusting into parallel relation to the opposite member of the chuck.

The upright post or pin 46 which cooperates with the feed screw 45 for shifting the parts comprising the shaft 6 and the ware supporting carriage, as aforesaid, is vertically shiftable in its casing 47 to provide for engaging its upper end or point with the threads of said screw and for withdrawing said end from engagement with said screw. Said pin is directed upward through the base $47^a$ and the hollow or bore 95 of said casing and carries thereon adjacent its upper end a guide collar 96 between which and said base portion $47^a$ is interposed a pin-encircling compression spring 97. The end of the pin which projects below the base portion $47^a$ has directed therethrough a cross-pin 98 which has its oppositely projecting ends disposed in seated underlying relation to the parallel members $99^a$ of the bifurcated end of a bar 99 that is slidable in a guideway 100 provided therefor between the base 1 and the base portion $47^a$ of said casing 47. The pin-engaged under surfaces of the members $99^a$ are inclined, as shown at 101, Fig. 6, so that when the bar 99 occupies its normal outwardly drawn position, shown in Fig. 6, the upright post 46, yieldingly supported by its spring 97, is permitted to occupy its elevated operative position, and so that, when said bar is thrust inward in the guide-way 100, said post will be drawn downward against the tension of its said spring to a point at which its upper end is withdrawn from engagement with the feed screw 45. The bar 99 is designed to be shifted manually, having suitable connection as through a link 102, with the adjacent end of the longitudinally shiftable bar 55, which has pivoted thereto a shifting lever 103 which is pivoted on the base 1 in a suitable position.

In the lowered, or inoperative, position of the post 46, the shaft 6 and the therewith carried mechanism is freely shiftable longitudinally for returning said parts to the initial working position shown in Fig. 1 from the final position to which said parts are moved during the operation of the machine. The means for accomplishing such right to left, or return, shifting of said parts, as herein shown, comprises a bell crank lever 104 which is suitably pivoted, as at 105, upon the base 1. One arm of said lever has connection with the left hand end of the shaft 6 through a common form of device 106 whereby is prevented relative horizontal movement of said elements while rotation of the shaft is in no wise interfered with.

Assuming that the parts of the machine occupy initial working position, as shown in Fig. 1, the operation, briefly stated, is as follows: Rotation is communicated to the shaft 6 from the belt wheel 16 through the intermediate gearing hereinbefore described. At the same time rotation is communicated to the disks $a$, $b$, $c$, $d$, $e$ and $f$ mounted on the shaft 49 through the gearing provided intermediate the shafts 6 and 49. As the single swell $x$ of the first of said series of disks mounts the roller 54 which it then overlies or overhangs, the entire carriage is rocked forward to a position in which the thereby carried article 28 of glassware is disposed with the surface thereof which is to be decorated in seated engagement with the edge of the rotating grinding wheel 34. This position is maintained during the interval of time required for the passage of said swell over the roller 54, in which interval said wheel acts to grind upon the ware a single element, or grape, of the decorative design which is being applied. Throughout the duration of said grinding interval the ware is maintained against rotation, the pin 33 of the lever 32 having previously entered the first socket 30 of the prearranged group of sockets provided in the cylinder 29, stopping rotation of the latter.

When the swell of the disk $a$ rides off the roller 54, the carriage immediately rocks back by gravity to its normal position for withdrawing the ware from the grinding wheel, and the supporting roller 59 thereof assumes seated relation to the stationary trackway 60.

Slightly prior to the end of the first revolution of the shaft 6, the projecting upper end of the post 46 engages the inclined portion 48 of the thread of the feed screw 45 and in the traverse of said portion effects lengthwise shifting of said shaft and the superposed carriage throughout the predetermined distance between alined, annularly arranged rows of grapes to be employed in the design applied to the ware. Such shifting is effected without hindrance due to the fact that the pin 33, previously seated in a socket 30 of the cylinder 29, as aforesaid, was withdrawn just prior to the initiation of the shifting movement by the backward rocking of the lever 32, one of the pins 44 which have a predetermined arrangement on the constantly rotating cylinder 39 having engaged the end of the arm 37 of said lever at the required instant and pushed said arm back ahead thereof. During the time that said arm 37 is so pushed back, the carriage shifting movement is effected.

The aforesaid carriage shifting movement results in carrying the next disk in series, as $b$, into overlying relation to the roller 54. Continued rotation of said series of disks results in forward rocking of the carriage for presenting the ware to the grinding wheel in each revolution of said disks a number of times corresponding to the number of swells $x$ in the disk which overlies said roller, and each such forward rocking movement presents to the grinding wheel the new portion of the surface of the ware required in the production of the predetermined design. As is obvious, the arrangement of the pins 33 on the cylinder 39, of the sockets 30 in the cylinder 29, and the number of swells on the various disks is such that the required number of grapes in a row in the design shall be ground upon the ware in the various succeeding revolutions and that the predetermined arrangement of the grapes of the design relative to each other both in the rows and to those in adjacent rows shall be accurately followed.

The feed screw 45 has a thread at the left hand end thereof in which the post 46 is adapted to be received upon the completion of the application of the design to the ware and which allows of indefinitely continued idle rotation of the feed screw and its shaft 6 following completion of the ware decorating process.

The shaft 6 and its superposed parts are returned to initial position by manual shifting thereof effected by operation of the lever 104 following manual shifting of lever 103 for lowering the feed-screw engaging post 46.

The shiftable bar 55 has a recess 107 in the top surface of the end thereof upon which rests the pivoted roller-carrying arm 53. Said recess is so located that, when said bar is shifted to the right for effecting lowering of the post 46, the arm 53 drops therein for lowering the roller 54 to a level at which it will not interfere with the return shifting movement thereover of the overlying series of disks. As said bar is returned to the position in which it allows the post 46 to resume its operative position, the arm 53 is gradually elevated to its normal position, sliding upon an inclined surface which partially defines said recess.

While I have herein described a specific mechanism with more or less particularity, it is to be understood that various changes in the form and arrangement of some of the parts are contemplated and may be resorted to without departing from the spirit or scope of the invention. I do not, therefore, desire to limit myself to details beyond the necessary requirements imposed by the limitations contained in the appended claims.

What is claimed is—

1. An engraving machine of the character described comprising, in combination with an engraving wheel, a rotary ware support, means for rocking said support toward and away from said wheel for carrying the ware into and out of operative relation to said wheel at predetermined intervals, means holding said support against rotation while it occupies its forwardly rocked position, said holding means including a cylinder having therein sockets grouped in an arrangement corresponding to that of the separate elements of the design to be produced, and means for intermittently advancing said support.

2. An engraving machine of the character described comprising, in combination with an engraving wheel, a carriage including a rotary ware support, said carriage being normally disposed in a position maintaining the ware withdrawn from engagement with said wheel, a cylinder provided with sockets having a group pattern arrangement corresponding to the design to be applied to the ware, said cylinder being rotatable with said ware support, a member adapted to successively interengage said sockets for maintaining said cylinder and said support against rotation, means for rocking said carriage forward to present the ware to the engraving wheel during the period of rest of said support, means for actuating withdrawal of said member from the sockets at predetermined times, and means for advancing the carriage while the latter occupies its normal position.

3. In an engraving machine, the combination with an engraving wheel, of a continuously rotating shaft, means whereby said shaft is periodically shifted longitudinally, a carriage shiftable with said shaft, a rotary ware support mounted on said carriage, said carriage being adapted for lateral rocking movement with respect to said shaft and normally disposed in a rearwardly swung position in which the ware is supported out of engagement with the wheel, means for arresting rotation of said support, and means for rocking said carriage forward to present the ware to said wheel throughout a definite interval during the rest period of said support, the support arresting means and the carriage rocking means being arranged to be actuated synchronously at predetermined times for effecting the engraving of designs in predetermined patterns.

4. In an engraving machine, the combination with an engraving wheel, of a carriage having a rotary ware support thereon, said carriage being rockable toward and away from said wheel for presenting to said wheel the ware borne by said support and for retracting said ware from said wheel, said carriage being normally maintained in its retracted position, means for arresting rotation of said support at predetermined times, means for rocking said carriage forward during the interval of rest of said support, and means for shifting said carriage periodically in a longitudinal direction, the operation of said arresting means, said rocking means and said shifting means being timed relatively to effect presentation of different surface areas of the ware to the action of said wheel for producing designs of predetermined pattern.

5. In an engraving machine, the combination with an engraving wheel, of a carriage having a rotary ware support thereon, said carriage being rockable toward and away from said wheel for presenting to said wheel the ware borne by said support and for retracting said ware from said wheel, said carriage being normally maintained in its retracted position, a cylinder connected to and rotatable with said ware support, means engageable with said cylinder for arresting rotation of said cylinder and said support, said means being arranged to operate at predetermined times, means for rocking said carriage forward during the interval of rest of said support, and means for intermittently shifting said carriage longitudinally, the operation of said arresting means, said rocking means and said shifting means being timed to effect presentation to the engraving wheel of different surface areas whereby is produced designs of predetermined pattern.

6. In an engraving machine, the combination with an engraving wheel, of a carriage having a rotary ware support thereon, said carriage being rockable toward and away from said wheel for presenting to said wheel the ware borne by said support and for retracting said ware from said wheel, said carriage being normally maintained in its retracted position, a cylinder connected to and rotatable with said ware support, said cylinder being provided with sockets disposed in a pattern arrangement substantially corresponding to the design to be engraved on the ware, means automatically engageable with said sockets for arresting rotation of said cylinder and said support, means for rocking said carriage forward during the interval of rest of said support, and means for intermittently shifting said carriage longitudinally.

7. In an engraving machine, the combination with an engraving wheel, of a carriage having a rotary ware support thereon, said carriage being rockable toward and away from said wheel for presenting to said wheel the ware borne by said support and for retracting said ware from said wheel, said carriage being normally maintained in its retracted position, a cylinder connected to and rotatable with said ware support, means engageable with said cylinder for arresting rotation of said cylinder and said support, said means being arranged to operate at predetermined times, means for rocking said carriage forward during the interval of rest of said support, said rocking means including a plurality of rotating disks mounted on said carriage, each disk being provided with a plurality of swells on its periphery having a predetermined arrangement, and an element adapted to cooperate with said swells for elevating said disks, and means for intermittently shifting said carriage longitudinally.

8. In an engraving machine, the combination with an engraving wheel, of a carriage having a rotary ware support thereon, said carriage being rockable toward and away from said wheel for presenting to said wheel the ware borne by said support and for retracting said ware from said wheel, said carriage being normally maintained in its retracted position, a cylinder connected to and rotatable with said ware support, means engageable with said cylinder for arresting rotation of said cylinder and said support, said means being arranged to operate at predetermined times, means for rocking said carriage forward during the interval of rest of said support, and means for intermittently shifting said carriage longitudinally, said shifting means comprising a continuously rotated longitudinally shiftable shaft upon which said carriage is mounted, a worm-like shifting gear fixed on said shaft, and a member cooperating with the threads of said gear for effecting shifting of the latter, said threads having an arrangement which provides for effecting shifting during a small fractional part only of each revolution of said gear.

In testimony whereof, I affix my signature.

HUGH G. HILL.